United States Patent
de Montmorillon et al.

(10) Patent No.: US 7,356,234 B2
(45) Date of Patent: Apr. 8, 2008

(54) CHROMATIC DISPERSION COMPENSATING FIBER

(75) Inventors: Louis-Anne de Montmorillon, Versailles (FR); Denis Molin, Draveil (FR); Marianne Bigot-Astruc, Le Chesnay (FR); Pierre Sillard, Le Chesnay (FR)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/743,365

(22) Filed: May 2, 2007

(65) Prior Publication Data

US 2007/0258686 A1 Nov. 8, 2007

(30) Foreign Application Priority Data

May 3, 2006 (FR) .................................. 06 03928

(51) Int. Cl.
*G02B 6/02* (2006.01)
(52) U.S. Cl. .................... 385/127; 385/123; 385/126
(58) Field of Classification Search ............... None
See application file for complete search history.

(56) References Cited

U.S. PATENT DOCUMENTS

| | | | |
|---|---|---|---|
| 5,361,319 A | 11/1994 | Antos et al. | |
| 5,568,583 A | 10/1996 | Akasaka et al. | |
| 6,263,138 B1 | 7/2001 | Sillard et al. | |
| 6,337,942 B1 | 1/2002 | Kato et al. | |
| 6,483,975 B1 | 11/2002 | Hsu et al. | |
| 6,665,482 B2 | 12/2003 | Kawasaki et al. | |
| 6,685,190 B1 | 2/2004 | Mayer et al. | |
| 2002/0186941 A1* | 12/2002 | Hsu et al. ................ | 385/123 |
| 2003/0044145 A1* | 3/2003 | Fleury et al. ............. | 385/123 |
| 2004/0105638 A1* | 6/2004 | Sillard et al. ............ | 385/123 |

FOREIGN PATENT DOCUMENTS

| EP | 1067412 A | 1/2001 |
|---|---|---|
| EP | 1255138 | 11/2002 |

OTHER PUBLICATIONS

J.C. Antona et al., Investigation of Advanced Dispersion Management Techniques for Ultra-Long Haul Transmissions, European Conference for Optical Communications, Sep. 2005.
French Search Report and Written Opinion dated Jan. 9, 2007 in French application No. 06/03928.

* cited by examiner

*Primary Examiner*—Tina M. Wong
(74) *Attorney, Agent, or Firm*—Summa, Allan & Addition, P.A.

(57) ABSTRACT

Disclosed is a chromatic dispersion compensating optical fiber comprising a central core, an intermediate cladding having a width ($r_2-r_1$) of 2.0 microns or greater, and a depressed inner cladding having a refractive index difference $Dn_3$ with the external optical cladding of $-3.0 \times 10^{-3}$ or lower. At a wavelength of 1550 nm, the optical fiber exhibits a positive chromatic dispersion of 21 ps/(nm·km) or higher and a ratio of mode radius to intermediate cladding radius of ($W_{02}/r_2$) of 0.7 or less. The present optical fiber has a good figure of merit value and limited bending and microbending losses. The optical fiber can be rolled up in a housing of reduced size in a chromatic dispersion compensating optical module having limited insertion losses and reduced polarization mode dispersion.

21 Claims, 3 Drawing Sheets

10 – optical fiber

11 – central core

12 – intermediate inner cladding

13 – depressed inner cladding

14 – outer cladding (refractive index $n_g$)

10 – optical fiber

11 – central core

12 – intermediate inner cladding

13 – depressed inner cladding

14 – outer cladding (refractive index $n_g$)

CHROMATIC DISPERSION COMPENSATING FIBER

CROSS-REFERENCE TO PRIORITY APPLICATIONS

This application hereby claims the benefit of pending French Application No. 06/03928 (filed May 3, 2006 at the French Patent Office), which is hereby incorporated by reference in its entirety.

FIELD OF THE INVENTION

The present invention relates to optical fiber transmissions and, more specifically, to the compensation of the chromatic dispersion in fiber optical transmission systems.

BACKGROUND OF THE INVENTION

For optical fibers, the refractive index profile is generally qualified in relation to the graphical representation of the function that associates the refractive index with the fiber radius. Conventionally, the distance r to the center of the fiber is shown along the abscissa, and the difference between the refractive index and the refractive index of the external cladding of the optical fiber along the ordinate axis. The refractive index profile, therefore, is referred to as "step," "trapezoidal," or "triangular" profile for graphs having the respective shapes of a step, trapezoid, or triangle. These curves are generally representative of the theoretical or set profile of the fiber. The manufacturing constraints of the fiber, however, may lead to a slightly different profile.

An optical fiber conventionally consists of (i) an optical core whose function is to transmit and possibly to amplify an optical signal, (ii) an optical cladding whose function is to confine the optical signal within the core, and (iii) an external cladding having a substantially constant refractive index $n_g$. For this purpose, the refractive indices of the core $n_c$ and of the external cladding $n_g$ are such that $n_c > n_g$. As is well known, the propagation of an optical signal in a single-mode optical fiber decomposes into a fundamental mode guided in the core and into secondary modes, called cladding modes, that are guided over a certain distance in the core-cladding assembly.

In the new, high bit-rate, wavelength-multiplexed transmission networks it is advantageous to manage chromatic dispersion, particularly for rates of 10 Gbits/s or higher. The objective, for all multiplex wavelength values, is to achieve a cumulated chromatic dispersion that is substantially zero on the link in order to limit pulse broadening. "Cumulated chromatic dispersion" is the name given to the integral of chromatic dispersion over the fiber length. When the chromatic dispersion is constant, the cumulated chromatic dispersion is equal to the product of chromatic dispersion and the length of the optical fiber. A cumulated value of a few dozen picoseconds per nanometer (ps/nm) for dispersion is generally acceptable. Near the wavelengths used in the system, it is also advantageous to avoid zero values of local chromatic dispersion for which non-linear effects are stronger. Finally, it is also advantageous to limit the cumulated chromatic dispersion slope over the multiplex range so as to avoid or limit distortions between the multiplex channels. This slope is conventionally the derivative of chromatic dispersion with respect to wavelength.

As line fibers for land transmission systems, single-mode fibers (SMF) or Non-Zero Dispersion Shifted Fibers (NZDSF) are conventionally used. NZDSF+ are dispersion shifted fibers having a non-zero, positive chromatic dispersion for the wavelengths at which they are used, typically around 1550 nm. For these wavelengths, these fibers have low chromatic dispersion, typically lower than 10 picoseconds per nanometer-kilometer (ps/(nm·km)) at 1550 nm, and a chromatic dispersion slope typically lower than 0.1 ps/(nm²·km).

To compensate chromatic dispersion and the chromatic dispersion slope in SMF or NZDSF+ used as line fibers, short lengths of Dispersion Compensating Fiber can be used (DCF); the fiber then has a negative chromatic dispersion and a negative chromatic dispersion slope. For the choice of DCF fiber, it is generally sought that the ratio of the chromatic dispersion over the chromatic dispersion slope of the chromatic dispersion compensating fiber is substantially equal to that of the line fiber. This ratio is designated by the abbreviation DOS for Dispersion Over Slope ratio.

U.S. Pat. No. 5,568,583 or U.S. Pat. No. 5,361,319 describes DCF fibers for compensating the chromatic dispersion of SMF fibers, and EP-A-1,067,412 describes a DCF for compensating the chromatic dispersion of NZDSF+s. These known DCFs, at a wavelength of 1550 nm, exhibit a negative chromatic dispersion and a negative chromatic dispersion slope.

Optical systems that are wavelength multiplexed, called Wavelength Division Multiplexing (WDM), generally consist of a concatenation of line fiber sections—SMF, NZDSF+ or others—with dispersion compensating modules inserted between the line fiber sections and comprising spooled DCF sections. The manner in which the dispersion compensating modules are distributed along the transmission line is called dispersion management; the objective of this management is to limit both non-linear effects and cumulated end-of-line dispersion. It is always sought, at the end of the line, to achieve a low cumulated chromatic dispersion and a zero cumulated chromatic dispersion slope.

In this context, the "transmission line section" refers to a part of an optical transmission system linking a transmitting element to a receiving element, these elements possibly being located at the end of the line or in nodes of the optical system. A line section, therefore, includes one or more concatenated line fiber sections and one or more sections of dispersion compensating fiber distributed between the sections of the line fiber. The line fiber sections usually generate a positive chromatic dispersion with a positive chromatic dispersion slope, whereas the sections of dispersion compensating fiber generate a negative chromatic dispersion with a negative chromatic dispersion slope. In the event of overcompensation, the line section will therefore exhibit a negative cumulated chromatic dispersion with a negative cumulated chromatic dispersion slope that has to be compensated for in order to arrive at zero dispersion at node entry or at the end of the line.

It is sometimes advantageous to insert an over-compensation along the transmission line, for example, to limit non-linear effects in the line fiber. It has also been found that overcompensation of the chromatic dispersion reduces the error rate at the receivers. For example, the article "Investigation of Advanced Dispersion Management Techniques for Ultra-Long Haul Transmissions" by J. C. Antona, M. Lefrancois, S. Bigo, and G. Le Meur, presented in September 2005 to the ECOC'05 Conference (European Conference for Optical Communications) indicates that overcompensation during transmission, illustrated in the article by a residual dispersion per subdivision or per negative line fiber section, makes it possible to improve the performance of WDM systems at 10 Gb/s. At the end of the line and/or at each node of the transmission system, however, the cumulated chromatic dispersion must be restored to zero or slightly positive. Yet, if the optical signal has been overcompensated, at the end of the line, the chromatic dispersion and the chromatic dispersion slope will be negative; it is then necessary, in order to offset this overcompensation, to use a fiber piece having a positive chromatic dispersion and a positive chromatic dispersion slope. For this purpose, sections of standard SMF (SSMF) or of Pure Silica Core Fibers (PSCF) are often used.

The major drawback with the use of a SSMF section to offset overcompensation is that the SSMF induces high losses with respect to the quantity of dispersion produced. This characteristic is generally determined by what is called the "Figure of Merit" (FOM). Figure of Merit is defined as the ratio of the chromatic dispersion D, in absolute value, to the attenuation of the signal in dB/km. For a SSMF, the FOM value is in the order of 85 ps/nm/dB. The PSCFs induce fewer optical losses and have a FOM value in the order of 125 ps/nm/dB, but they are costly.

In addition, as undersea fiber for intercontinental optical links, negative non-zero dispersion-shifted fibers are used, also called NZDSF$^-$. Fibers qualified as NZDSF$^-$ are dispersion shifted fibers having a non-zero, negative chromatic dispersion for the wavelengths at which they are used, typically around 1550 nm. At these wavelengths, these fibers exhibit a low chromatic dispersion, typically lower than $-2$ ps/(nm·km) at 1550 nm, and a chromatic dispersion slope that is typically lower than 0.1 ps/(nm$^2$·km).

To compensate the chromatic dispersion and the chromatic dispersion slope in NZDSF$^-$s used as undersea lines, Positive Dispersion Compensating Fibers (P-DCF) must be used. Up until now, in marketed and installed undersea transmission systems, portions of SSMFs have been used to compensate the negative dispersion of NZDSF$^-$s, whether in-line (cabled P-DCF), at the transmitter, or at the receiver (module P-DCF). However, as indicated above, the SSMFs have a FOM value that is too low for module use. PSCFs may also be used, but they are costly.

U.S. Pat. No. 6,337,942 proposes a positive chromatic dispersion compensating fiber to compensate an NZDSF. This optical fiber has a structure with a depressed cladding adjacent the central core and an external optical cladding. The central core can be doped with germanium or pure silica. The fiber disclosed in U.S. Pat. No. 6,337,942 exhibits a strong positive chromatic dispersion, of between 18 ps/(nm·km) and 21 ps/(nm·km) for transmission losses in the order of 0.2 dB/km, which leads to a FOM of 105 ps/nm/dB or lower. The presence of a depressed cladding adjacent the central core, with a strong refractive index difference, makes it possible to increase the chromatic dispersion while limiting the increase in the cut-off wavelength, but it also has the effect of increasing the transmission losses. To limit these losses, U.S. Pat. No. 6,337,942 also proposes increasing the diameter of the depressed cladding, which is between 36 microns and 46 microns, for a central core whose diameter is between 9 microns and 10 microns. A depressed cladding doped with fluorine, however, is costly to manufacture.

U.S. Pat. No. 6,665,482 describes a transmission fiber having a pedestal structure with a central core, a first positive inner cladding, and an external optical cladding. This fiber has an effective surface area of more than 90 μm$^2$ at a wavelength of 1550 nm, making it possible to reduce non-linear effects and, hence, to increase the operating margins of wavelength multiplexed high bit-rate transmission networks. The increase in the fiber's effective surface area also leads to an increase in the positive chromatic dispersion compared with a SSMF, but it is intentionally limited to 20 ps/(nm·km) to avoid network penalties due to high cumulated dispersion values (before compensation). The transmission losses in the order of 0.2 dB/km lead to a FOM value of 100 ps/nm/dB or lower.

EP 1,255,138 describes a positive dispersion optical fiber having a large effective area, the fiber having a doped core region, a first annular region, a second depressed annular region, and a cladding region. The second depressed annular region has a normalized index difference between $-0.08$ and $-0.20$ Δ%, and an absolute index difference between $-1.16$ and $-1.9 \times 10^{-3}$ when calculated with respect to the index of silica.

U.S. Pat. No. 6,685,190 describes a fiber having an effective surface area of more than 110 μm$^2$ at a wavelength of 1550 nm, enabling a reduction in non-linear effects and hence an increase in the operating margins of wavelength multiplexed high bit-rate transmission networks. The increase in the effective surface area of the fiber also leads to an increase in the positive chromatic dispersion, with a dispersion of between 18 ps/(nm·km) and 23 ps/(nm·km) for transmission losses in the order of 0.17 dB/km which leads to a FOM value of between 105 ps/nm/dB and 135 ps/nm/dB.

Despite higher positive chromatic dispersion values and improved FOM values compared with SSMFs, the fibers described in U.S. Pat. No. 6,658,190 are not well adapted for compensating the negative chromatic dispersion of an undersea NZDSF, or for offsetting overcompensation in a node of a land communication system. Indeed, an increase in the surface area leads to an increase in bending and microbending losses. Yet a DCF is intended to be rolled up in a housing of an optical dispersion compensating module in which fiber portions are superimposed; the fiber must therefore have limited bending and microbending losses for standard coatings and diameters (namely a naked fiber diameter of around 125 microns, a fiber diameter with first coating of around 200 microns, and a fiber diameter with second coating of around 250 microns).

None of the profiles of the prior art fibers cited and analyzed above makes it possible to obtain an optimal compromise between an increased FOM and acceptable characteristics in terms of bending and microbending losses for a positive chromatic dispersion compensating fiber (P-DCF).

SUMMARY OF THE INVENTION

There is, therefore, a need for a positive chromatic dispersion compensating fiber with which it is possible to (i) compensate the chromatic dispersion of a negative chromatic dispersion transmission fiber (e.g., an undersea link fiber) or (ii) offset overcompensation at the end of the line or on node entry in an optical system. There is a further need for a fiber that has an improved FOM value and limited bending and micro-bending losses.

For this purpose, the invention proposes a fiber structure with an inner depressed cladding that guarantees a high positive chromatic dispersion and low bending and microbending losses, and that is distanced from the central core to limit transmission losses. The inventive fiber may be used in a chromatic dispersion-compensating module that is of reduced size for an improved chromatic dispersion compensation efficacy and limited insertion losses.

More particularly, the invention proposes a chromatic dispersion compensating optical fiber that has a central core with a radius $r_1$ and a refractive index difference $Dn_1$ with an external optical cladding. An intermediate cladding with a radius $r_2$ and a refractive index difference $Dn_2$ with the external optical cladding is adjacent the central core. The intermediate cladding has a width $(r_2-r_1)$ of 2.0 microns or greater, typically between 2.0 microns and 4.5 microns. A depressed inner cladding is positioned between the intermediate cladding and the external optical cladding. The depressed inner cladding has a radius $r_3$ and a refractive index difference $Dn_3$ with the external optical cladding. The refractive index difference $Dn_3$ is about $-3.0 \times 10^{-3}$ or lower.

At a wavelength of 1550 nm, the fiber has a positive chromatic dispersion of 21 ps/(nm·km) or higher and a ratio of mode radius to intermediate cladding radius of 0.7 or less. Mode radius is the radius of the fundamental mode LP01 propagating in the fiber. Mode radius is denoted herein as $W_{02}$ and is determined by Petermann's second definition. See K. Petermann, Electronic Letters, 1983, Vol. 19, pp. 712-714, which is hereby incorporated by reference.

According to the embodiments of this invention, at a wavelength of 1550 nm, the fiber has a Figure of Merit (FOM) value of 105 ps/nm/dB or higher. In another embodiment, the central core has a radius $r_1$ of between 4 microns and 6.50 microns for a refractive index difference with the external optical cladding ($Dn_1$) of between $4.0 \times 10^{-3}$ and $6.5 \times 10^{-3}$. The depressed cladding has a radius $r_3$ of 16 microns or less and typically between 12 microns and 16 microns; the intermediate cladding has a radius $r_2$ of between 6 microns and 11 microns and a refractive index difference $Dn_2$ with the external optical cladding of between $-1.0$ and $2.0 \cdot 10^{-3}$. At a wavelength of 1625 nm, the fiber has bending losses, over a radius of 10 mm, of 1 dB/m or lower; at a wavelength of 1550 nm, the fiber has microbending losses up to 0.8 times less than the microbending losses in a SSMF subjected to identical constraints; the microbending losses of a SSMF are around 1 dB for the test method called fixed diameter drum method ("méthode du touret" in French). This method is described in the technical recommendations by Subcommittee 86A of the International Electrotechnical Commission under reference CEI TR-62221.

In the fundamental propagation mode at 1550 nm, the fiber has an effective surface area ($A_{\mathit{eff}}$) of 80 $\mu m^2$ or greater. The fiber has an effective cut-off wavelength ($\lambda_{Ceff}$) of 1600 nm or lower. At a wavelength of 1550 nm, the fiber has less than 1.3 percent energy in the depressed cladding.

The invention also concerns a chromatic dispersion compensating module containing at least one portion of the inventive fiber. Depending upon embodiments, the inventive module may also comprise one or more of the following characteristics:

At a wavelength of 1550 nm, the module shows insertion losses of 12.5 dB or lower for a cumulated dispersion of 1338 ps/nm; the value of 1338 ps/nm corresponds to the standard cumulated dispersion of about 80 km of standard single mode fiber, being 16.7 ps/(nm·km) multiplied by 80 km gives about 1338 ps/nm. In this embodiment (wavelength=1550 nm), the module shows a polarization mode dispersion of 0.50 ps or lower.

At a wavelength of between 1530 nm and 1570 nm, the module shows insertion losses of 13 dB or lower for a cumulated dispersion of 1338 ps/nm.

The invention may further include a housing into which a portion of fiber is rolled. In one embodiment, the housing has a thickness at least 25 percent smaller than the thickness of a housing receiving a SSMF for an identical cumulated dispersion value. This means that because both less fiber length is required and lower bending sensitivity is achieved, the thickness of the housing can be significantly reduced. The size of the housing of a SSMF is taken as a reference.

Other characteristics and advantages of the invention will become apparent on reading the following detailed description, given by way of example and with reference to the attached drawings.

DETAILED DESCRIPTION

Figure 1:
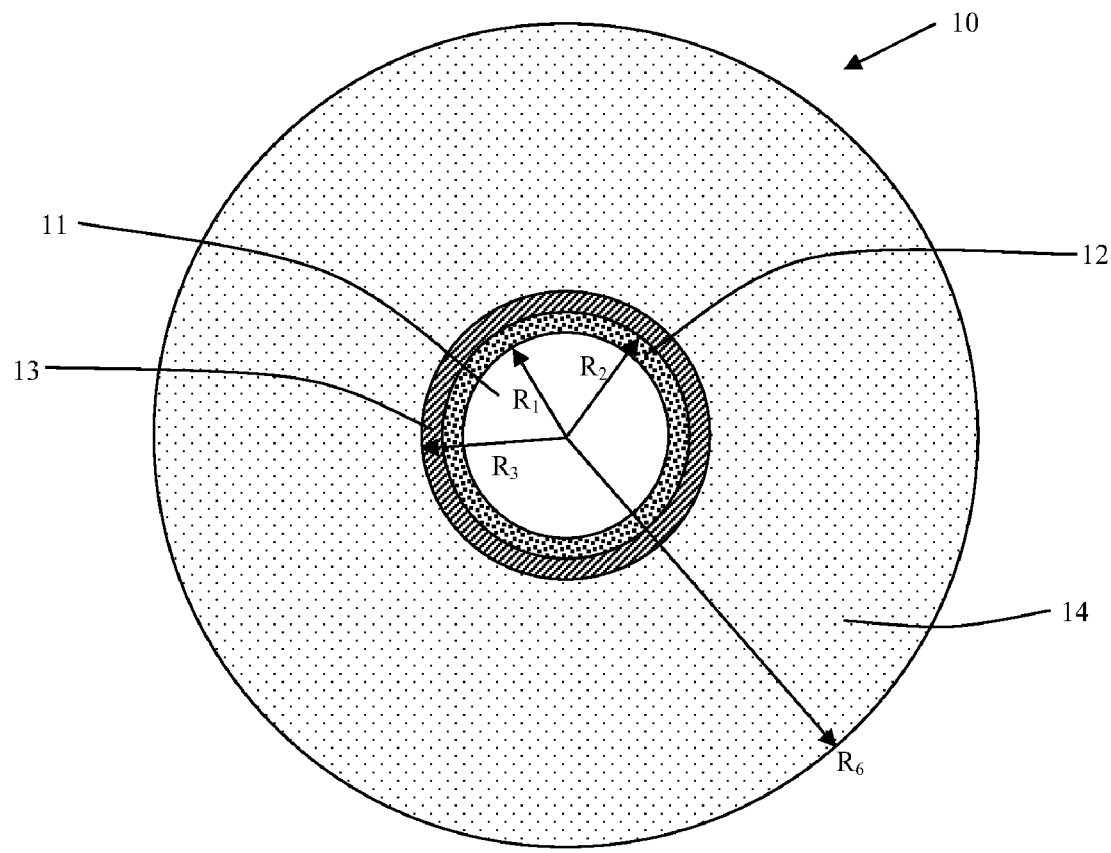
FIG. 1 depicts the cross-section (not to scale) of an exemplary optical fiber according to the present invention.

To compensate the negative chromatic dispersion or to offset an overcompensation, the invention proposes the use of a chromatic dispersion compensating optical fiber 10 having a particular refractive index profile with a central core 11, an intermediate cladding 12, and an inner depressed cladding 13, making it possible at a wavelength of 1550 nm to achieve a chromatic dispersion of 21 ps/(nm·km) or higher with a FOM value of 105 ps/nm/dB or higher. See FIG. 1.

With the presence of the depressed inner cladding, it is possible to achieve the desired chromatic dispersion value with low bending and microbending losses. The distancing of this depressed cladding from the central core makes it possible to limit transmission losses. The radius $r_3$ of this depressed cladding is typically less than 16 microns to limit manufacturing costs related to depositing too large of a section of doped silica (e.g., doped with fluorine).

Figure 2:
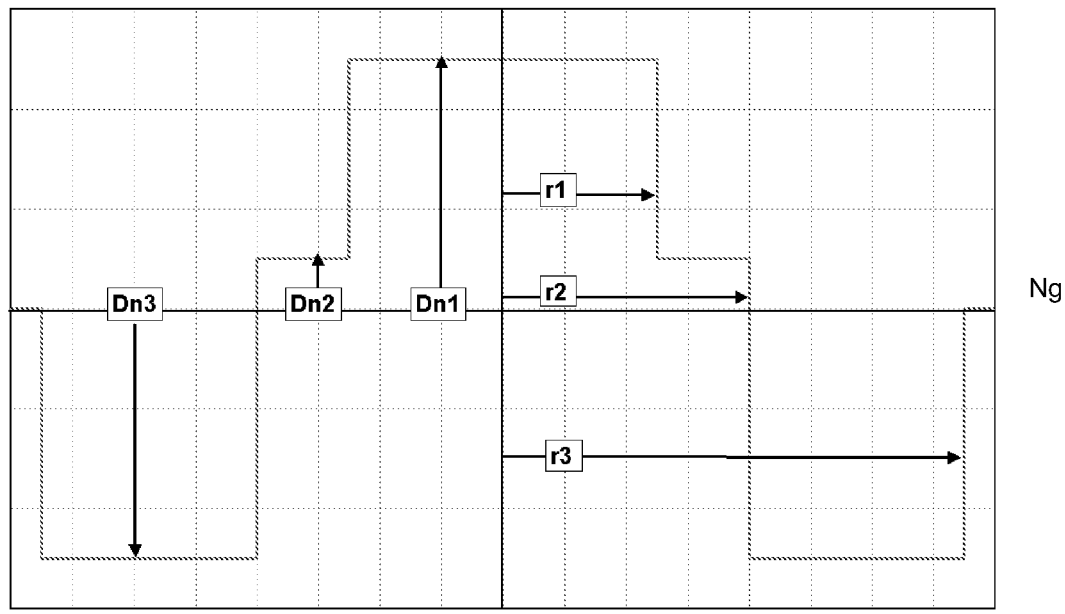
FIG. 2 is a schematic graph of a set profile for a dispersion compensating fiber according to one embodiment of the invention.

FIG. 2 schematically illustrates a possible refractive index profile for an inventive dispersion compensating fiber. The illustrated profile is a set profile (i.e., representing the theoretical profile of the fiber). The fiber was actually obtained after drawing from a preform, possibly having a slightly different profile.

The inventive chromatic dispersion compensating fiber has a central core of radius $r_1$. The central core has a positive refractive index difference $Dn_1$ with an external optical cladding. The fiber further includes an intermediate cladding of radius $r_2$ having a low positive refractive index difference $Dn_2$ with the external cladding. An inner depressed cladding of radius $r_3$ is positioned between the intermediate cladding and the external cladding. The inner depressed cladding has a negative refractive index difference $Dn_3$ with the external cladding. The refractive index of the external cladding is called $n_g$ and is shown in FIG. 2 as the abscissa or X-axis.

Table I below illustrates the characteristics of several possible refractive index profiles for a chromatic dispersion compensating fiber of the invention. The first column allocates a reference to each example; the following columns give the radius value of the central core $r_1$, radius value of the intermediate cladding $r_2$, the width of the intermediate cladding ($r_2-r_1$), and the radius of the depressed cladding $r_3$. The remaining columns give the values of the refractive index differences with the external cladding ($n_g$) for each section. The refractive index differences are measured at a wavelength of 633 nm.

Examples 1-7 are fibers according to the invention, and Examples 1b, 2b, SMF1, and SMF2 are comparative examples (i.e., not made according to the invention herein). SMF1 corresponds to a SSMF. Examples 1b, SMF1 and SMF2 do not have a depressed inner cladding, and Example 2b has an intermediate cladding that is too narrow, which leads to high losses and reduced FOM value.

TABLE I

| Profile | r1 (μm) | r2 (μm) | r2-r1 (μm) | r3 (μm) | $Dn_1$ @ 633 nm (×10³) | $Dn_2$ @ 633 nm (×10³) | $Dn_3$ @ 633 nm (×10³) |
|---|---|---|---|---|---|---|---|
| Ex. 1 | 5.10 | 7.50 | 2.40 | 15.0 | 5.1 | 0 | −5.0 |
| Ex. 1b | 5.10 | | | | 5.1 | | |
| Ex. 2 | 5.69 | 7.95 | 2.26 | 15.0 | 4.8 | 0.5 | −5.0 |
| Ex. 2b | 5.69 | 7.43 | 1.74 | 15.0 | 4.8 | 0.5 | −5.0 |
| Ex. 3 | 5.40 | 8.50 | 3.10 | 15.0 | 5.0 | 0.2 | −5.0 |
| Ex. 4 | 4.59 | 7.50 | 2.91 | 15.0 | 5.5 | 2.0 | −5.0 |
| Ex. 5 | 6.30 | 8.38 | 2.08 | 14.7 | 4.3 | 1.0 | −6.0 |
| SMF1 (SSMF) | 4.35 | | | | 5.2 | | |
| Ex. 6 | 4.55 | 7.35 | 2.80 | 14.0 | 5.2 | 0 | −5.0 |
| SMF2 | 5.70 | | | | 4.4 | | |
| Ex. 7 | 5.70 | 8.10 | 2.40 | 15.0 | 4.4 | 0 | −5.0 |

Figure 3:
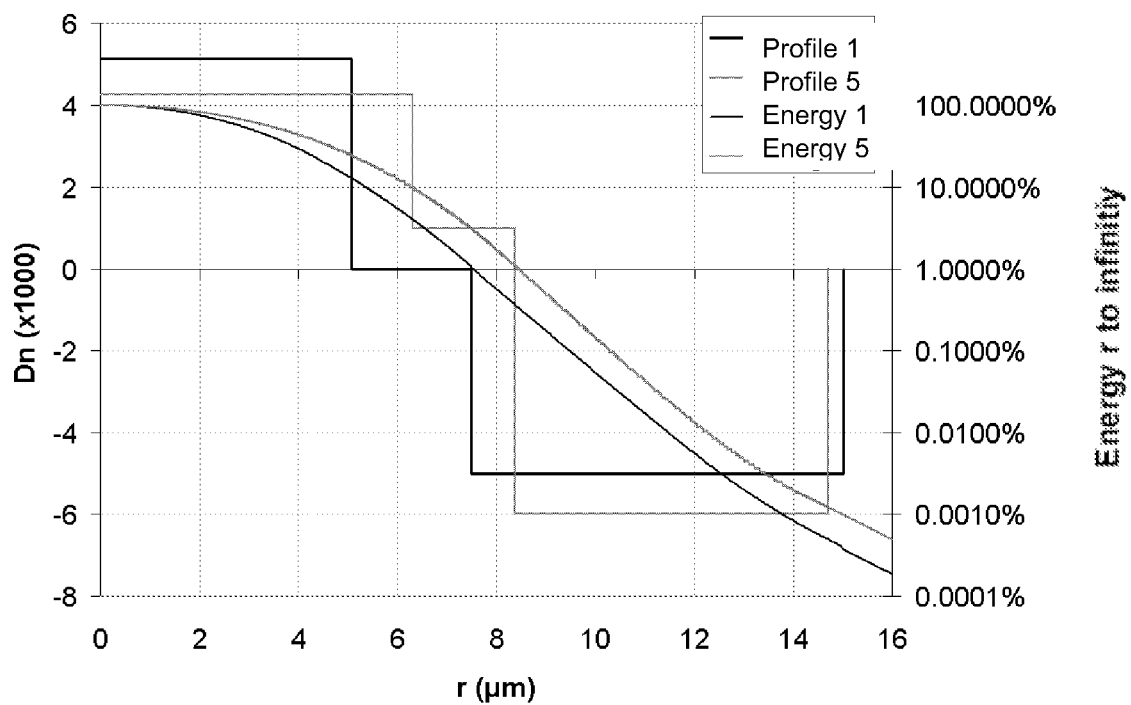
FIG. 3 is a graph of two examples of profiles of the inventive fiber and the energy percentage of the fundamental mode (LP01) propagating beyond radius r at 1550 nm in these fibers, meaning that if at a certain radius r the energy is, for example, 10 percent, then outside of the part of the fiber having a radius of r, 10 percent of the energy propagates.

The inventive chromatic dispersion compensating fiber has a depressed cladding that is distanced from the central core making it possible to achieve high positive chromatic dispersion values with a high FOM. The central core has a radius $r_1$ and a refractive index difference $Dn_1$ close to those of a SSMF fiber so that the fiber, for an effective surface area greater than 80 μm², maintains a single-mode propagation of the optical signal. The presence of the depressed cladding $Dn_3$ makes it possible to increase the chromatic dispersion induced by the inventive dispersion compensating fiber while guaranteeing low bending and micro-bending losses. The presence of a relatively wide intermediate cladding ($r_2-r_1$) between the central core and the depressed cladding makes it possible to reduce linear losses in the fiber. With an intermediate cladding width ($r_2-r_1$) of 2 microns or greater, the field of the optical signal scarcely enters the depressed cladding, as illustrated in FIG. 3.

Table II illustrates the optical characteristics of dispersion compensating fibers corresponding to the example of refractive index profiles given in Table I. The first column reproduces the references of the first column in the Table I. The following columns, for each fiber profile, give the simulated values of the effective cut-off wavelength $\lambda c_{eff}$, chromatic dispersion D, ratio of the chromatic dispersion over the chromatic dispersion slope (DOS), Figure of merit (FOM), bending losses $BL_{10mm}$, microbending losses Sμc, effective surface area $A_{eff}$, percentage of energy present in the depressed cladding (denoted Energy3), and the ratio of normalized mode radius (being the radius of the fundamental mode LP01 propagating in the fiber, denoted $W_{02}$ and as determined by Petermann's second definition) to the radius of the intermediate cladding ($r_2$), which ratio is denoted $W_{02}/r_2$.

The values of chromatic dispersion D, DOS, FOM, effective surface area $A_{eff}$, Energy3 and mode radius $W_{02}$ are given at a wavelength of 1550 nm. The cut-off wavelength $\lambda c_{eff}$ corresponds to the wavelength on and after which the optical signal becomes single-mode after propagating over two meters of fiber, such as defined by Subcommittee 86A of the International Electrotechnical Commission in standard CEI 60793-1-44. The values of bending losses $BL_{10mm}$ are given at a wavelength of 1625 nm for a curvature radius of the fiber of 10 mm. The values of microbending losses Sμc are relative and expressed with respect to the losses in a SSMF subjected to the same constraints (i.e., for a fiber 125 microns in diameter). The microbending losses may be measured by using a so-called fixed diameter drum method ("méthode du touret" in French). This method is described in the technical recommendations by Sub-committee 86A of the International Electrotechnical Commission under reference CEI TR-62221.

TABLE II

| | $\lambda_{Ceff}$ (nm) | D @ 1550 nm (ps/nm/km) | DOS @ 1550 nm | FOM @ 1550 nm (ps/nm/dB) | $BL_{10\,mm}$ @ 1625 nm (dB/m) | Sμc @ 1550 nm | $A_{eff}$ @ 1550 nm (μm²) | Energy3 @ 1550 nm (%) | $W_{02}/r_2$ @ 1550 nm |
|---|---|---|---|---|---|---|---|---|---|
| Ex. 1 | <1500 | 22.2 | 350 | >110 | <1 | 0.5 | 85 | 1.09 | 0.68 |
| Ex. 1b | ~1500 | 19.5 | 330 | <100 | −10 | 0.5 | 95 | | |
| Ex. 2 | <1550 | 22.8 | 355 | >115 | <1 | 0.5 | 102 | 1.11 | 0.69 |
| Ex. 2b | ~1550 | 23.0 | 360 | <105 | <1 | 0.5 | 98 | 1.61 | 0.72 |
| Ex. 3 | <1550 | 22.1 | 350 | >110 | <1 | 0.5 | 95 | 0.58 | 0.63 |
| Ex. 4 | <1550 | 22.0 | 340 | >110 | <1 | 0.3 | 90 | 1.28 | 0.69 |
| Ex. 5 | <1600 | 23.2 | 360 | >115 | <1 | 0.8 | 120 | 1.09 | 0.69 |
| SMF 1 | <1300 | 16.8 | 290 | <90 | >10 | 1 | 82 | | |
| Ex. 6 | <1350 | 21.4 | 340 | >105 | <1 | 0.7 | 77 | 1.12 | 0.66 |
| SMF 2 | >1550 | 20.3 | 333 | <105 | >10 | 1 | 115 | | |
| Ex. 7 | <1550 | 22.8 | 355 | >115 | <1 | 0.8 | 111 | 1.25 | 0.70 |

It can be seen in Table II that for all the profiles of the dispersion compensating fiber of the invention, the chromatic dispersion at 1550 nm is greater than 21 ps/(nm·km), and the FOM is greater than 105 ps/nm/dB. In certain embodiments, the FOM is even greater than 110 ps/nm/dB. It can also be ascertained that for all of the inventive profiles, the bending losses are very low over a radius of curvature of 10 mm at the wavelength of 1625 nm. In fact, the bending losses less than 1 dB/m and microbending losses are markedly lower than the losses in a SSMF.

FIG. 3 illustrates the profiles of Examples 1 and 5 of the inventive fiber. FIG. 3 shows the energy percentage of the fundamental mode LP01 propagating beyond radius r at 1550 nm in the fiber of these two examples. It is seen that little energy is propagated in and beyond the depressed cladding. The chromatic dispersion in the fiber, therefore, is increased with no additional losses, and the fiber maintains its single-mode nature at the used wavelengths. In particular, the ratio of the radius of the fundamental mode (LP01) propagating in the fiber, denoted $W_{02}$ and determined by Petermann's second definition, over the intermediate cladding radius $r_2$ is less than 0.7. This controlled ratio guarantees that the linear losses in the fiber are limited and makes it possible to achieve high FOM values for the inventive dispersion compensating fiber.

In addition, it can be seen in Table II that the energy percentage in the depressed cladding, denoted Energy3, is limited and less than 1.3 percent. The inventive fiber therefore exhibits a limited effective cut-off wavelength $\lambda c_{eff}$ of less than 1600 nm, and even less than 1550 nm in certain embodiments. The depressed cladding, which contains very little energy of the signal propagating in the fiber, also affords good protection against bending and microbending losses. In particular, at a wavelength of 1625 nm, the dispersion compensating fiber of this invention shows bending losses of 10 dB/m or less over a radius of curvature of 10 mm ($BL_{10mm}$), and microbending losses that are distinctly lower than those of a SSMF.

The inventive fiber in Example 6 can be obtained from a SSMF (SMF1) by slightly increasing the core radius $r_1$ up to 4.55 microns, and by adding a depressed section having a refractive index difference with the external cladding of $-5 \times 10^{-3}$ so that $(r_2-r_1)=2.8$ microns and $r_3=14$ microns. A ratio is then obtained of $W_{02}/r_2=0.66$ with 1.12 percent energy present in the depressed cladding. All this leads to a marked increase in chromatic dispersion at 21.4 ps/(nm·km), and a marked reduction in bending losses ($BL_{10mm} \leq 1$ dB/m @1625 nm) and a sensitivity to microbending losses which is 0.7 times lower compared with a SSMF.

The inventive fiber in Example 7 may be obtained from a SMF having a large effective surface area (SMF2) by adding a depressed section having a refractive index difference with the external cladding of $-5 \times 10^{-3}$ and having a radius so that $(r_2-r_1)=2.4$ microns and $r_3=15.0$ microns. A ratio is then obtained of $W_{02}/r_2=0.70$ with 1.15 percent energy present in the depressed cladding. All this leads to a smaller effective cut-off wavelength $\lambda c_{eff}$, a distinct increase in chromatic dispersion at 22.8 ps/(nm·km), a marked reduction in bending losses ($BL_{10mm} \leq 1$ dB/m @1625 nm), and a sensitivity to microbending losses that is 0.8 times lower than in a SSMF.

Figure 4:
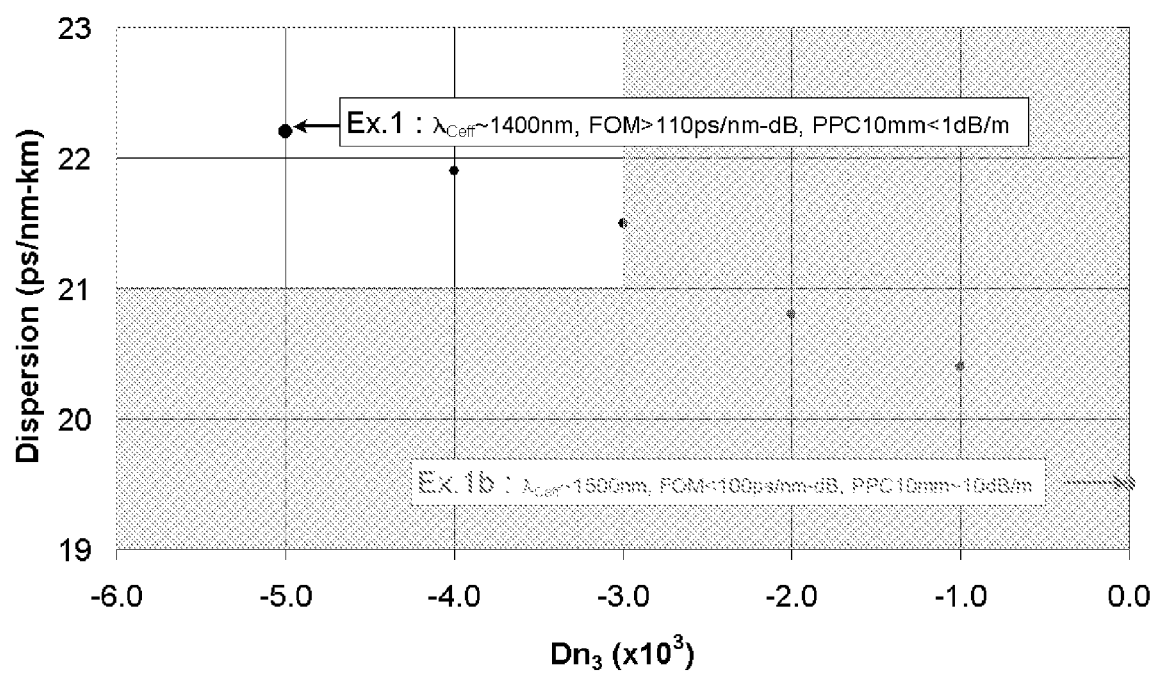
FIG. 4 is a graph illustrating the value of positive chromatic dispersion in relation to the refractive index difference of the depressed cladding with the external cladding.

FIG. 4 better illustrates the impact of the depressed cladding on the optical characteristics of the dispersion compensating fiber. FIG. 4 is a graph illustrating the value of the chromatic dispersion in relation to the refractive index value $Dn_3$ of the depressed cladding.

The point in the graph in FIG. 4 at which the chromatic dispersion is greatest corresponds to the fiber in Example 1. Based on this fiber profile (Example 1) and solely by increasing the refractive index difference $Dn_3$ of the depressed cladding up to 0, one arrives at the fiber of Example 1b. In analyzing Example 1b, which is a fiber made by means that are outside the scope of this invention, it is seen that the chromatic dispersion drops to 19.5 ps/(nm·km). This reduces the FOM value to below 100 ps/nm/dB at substantially constant linear losses. Bending losses $BL_{10mm}$ are increased up to 10 dB/m at 1625 nm and $\lambda c_{eff}$ is also increased.

The inventive dispersion compensating fiber can be manufactured by drawing from a preform having one of the above-described refractive index profiles. The profiles of preforms may be made from a silica tube in which layers of doped silica are arranged and then sleeved or overclad to complete the external optical cladding. Depositing may be performed by Modified Chemical Vapor Deposition (MCVD) and/or Plasma Chemical Vapor Deposition (PCVD). PCVD is particularly suited to the fabrication of layers of depressed cladding, but it is possible to fabricate the preform for the inventive fiber using CVD, VAD or OVD techniques.

The FOM values given in Table II correspond to examples of conventional, low-cost fibers, such as those not having a pure silica core or, more exactly, having an external optical cladding whose refractive index difference (in comparison to the core) is close to that of silica. The inventive fiber is typically made with an external optical cladding whose refractive index difference is close to that of silica, but it can nevertheless be made with a core of pure silica, which further reduces linear losses and improves the FOM. The pure silica, however, increases the costs since an external cladding would then have to be made of doped silica having a lower refractive index difference than pure silica.

The dispersion compensating fiber of this invention may be used in a dispersion-compensating module for a long haul, high bit-rate transmission system. The inventive dispersion-compensating module may be used to compensate the chromatic dispersion in an undersea fiber link having negative chromatic dispersion, or to offset an overcompensation in a land transmission line with a fiber having a positive chromatic dispersion.

A transmission system conventionally has an optical signal transmitter over a predetermined wavelength range (e.g., the C band or L band) and an optical transmission fiber such as an NZDSF (e.g., for a trans-Atlantic transmission system). The transmission fiber, over the range of wavelengths under consideration, exhibits a negative chromatic dispersion and a positive chromatic dispersion slope. A P-DCF can be cabled and used in-line, or in a module provided at each node or at each end of the system to compensate cumulated chromatic dispersion in a line portion.

A dispersion compensating fiber arranged in a the optical module is generally rolled up in a housing of the module. Owing to the search for miniaturizing housings, the dispersion compensating fibers are intended to be rolled up over increasingly smaller diameters. Also, the superposition of fiber rolled up in the module housings causes microbending constraints on the fibers.

With space often being critical, the inventive fiber, therefore, is particularly well adapted for its application to a dispersion-compensating module having a small size housing taking up little space at the transmitter, at the nodes, or at the receiver in the transmission systems.

Table III below gives the size and optical characteristics of a conventional dispersion-compensating module containing 79.5 km of SSMF fiber (SSMF 1) rolled up on a mandrel substantially of a diameter of 90 mm, and of a module of the invention containing 63.1 km of inventive fiber rolled up on a mandrel substantially of a diameter of 90 mm. The inventive fiber substantially corresponds to Example 1 in Tables I and II.

Table III successively gives the dimensions of the housing in mm³, the length of the fiber in km, the effective cut-off wavelength $\lambda_{Ceff}$, the cumulated chromatic dispersion in ps/nm in the fiber portion located in the module, the welding losses and the insertion losses in dB, maximum insertion losses on band C+ of 1530 to 1570 nm, the effective surface area $A_{eff}$ in µm², and the polarization mode dispersion in picoseconds (ps) denoted PMD. The values of chromatic dispersion D, welding losses and insertion losses, effective surface area $A_{eff}$ and PMD are given at the wavelength of 1550 nm.

TABLE III

| Modules | Dimensions (mm · mm · mm) (w · l · h) | Fiber length (km) | $\lambda c_{eff}$ | Cum. D @ 1550 nm (ps/nm) | Welding loss @ 1550 nm (dB) | Insertion loss @ 1550 nm (dB) | Insertion loss max C+ band (dB) | $A_{eff}$ @ 1550 nm (μm²) | Cum. PMD @ 1550 nm (ps) |
|---|---|---|---|---|---|---|---|---|---|
| SMF | 224 · 234 · 195 | 79.5 | 1300 | 1338 | 0.16 | 15.7 | 16.0 | 82 | 0.87 |
| present | 224 · 234 · 145 | 63.1 | 1450 | 1338 | 0.20 | 12.5 | 12.8 | 85 | 0.43 |

Table III shows that the inventive module has smaller dimensions as compared with a conventional SMF. In particular, it is less thick, and its insertion losses and cumulated PMD are distinctly reduced. In addition, since the inventive fiber has a very good bending resistance and low sensitivity to microbending, it does not exhibit any increased losses after winding. The insertion losses of the module remain very low over the entire C+ band used from 1530 to 1570 nm.

The use of an inventive fiber would also make it possible—for dispersion compensating modules with 335 ps/nm cumulated chromatic dispersion at 1550 nm— (equivalent to 20 km of standard SSMF) to downscale from a thickness of 95 mm to 45 mm; and for dispersion compensating modules with 837 ps/nm cumulated chromatic dispersion at 1550 nm (equivalent to 50 km SSMF), the thickness could be reduced from 145 mm to 95 mm, all with a constant mandrel diameter of substantially 90 mm.

Also, given the good resistance of the inventive fiber to bending and microbending, the diameters of the mandrels used in the dispersion compensating modules could be reduced without affecting the insertion losses, which would consequently further reduce the dimensions of the module housings.

In the specification and the figures, typical embodiments of the invention have been disclosed. Specific terms have been used only in a generic and descriptive sense, and not for purposes of limitation. The scope of the invention is set forth in the following claims.

The invention claimed is:

1. A dispersion compensating optical fiber, comprising:
a central core surrounded by an external optical cladding, said central core having a radius $r_1$ and a refractive index difference $Dn_1$ with said external optical cladding;
an intermediate cladding positioned between said central core and said external optical cladding, said intermediate cladding having a radius $r_2$, a width $(r_2-r_1)$ greater than or equal to about 2.0 microns, and a refractive index difference $Dn_2$ with said external optical cladding; and
a depressed inner cladding positioned between said intermediate cladding and said external optical cladding, said inner cladding having a radius $r_3$ and a refractive index difference $Dn_3$ with said external optical cladding, the refractive index difference $Dn_3$ being less than or equal to about $-3.0\times10^{-3}$, wherein at a wavelength of 1550 nm, the optical fiber has a positive chromatic dispersion greater than or equal to about 21 ps/(nm·km) and a ratio of the mode radius of the fundamental mode LP01 propagating in the optical fiber ($W_{02}$) over the radius of the intermediate cladding ($W_{02}/r_2$) less than or equal to about 0.7.

2. The optical fiber according to claim 1 having, at a wavelength of 1550 nm, a Figure of Merit (FOM) greater than or equal to 105 ps/nm/dB.

3. The optical fiber according to claim 1, wherein said central core has a radius $r_1$ between about 4 microns and 6.50 microns for a refractive index difference $Dn_1$ with said external optical cladding between about $4.0\times10^{-3}$ and $6.5\times10^{-3}$.

4. The optical fiber according to claim 1, wherein said intermediate cladding has a radius $r_3$ less than or equal to about 16 microns.

5. The optical fiber according to claim 4, wherein said radius $r_3$ is between about 12 microns and 16 microns.

6. The optical fiber according to claim 1, wherein said intermediate cladding has a refractive index difference $Dn_2$ with said external optical cladding, and wherein $Dn_2$ is between $-1.0\times10^{-3}$ and $2.0\times10^{-3}$.

7. The optical fiber according to claim 1, wherein said intermediate cladding has a radius $r_1$ that is between about 6 microns and 11 microns.

8. The optical fiber according to claim 1, wherein said intermediate cladding has a width $(r_2-r_1)$ between about 2.0 microns and 4.5 microns.

9. The optical fiber according to claim 1, wherein said depressed inner cladding has a refractive index difference $Dn_3$ with said external optical cladding less than or equal to $-3.5\times10^{-3}$.

10. The optical fiber according to claim 1 having, at a wavelength of 1625 nm, bending losses less than or equal to about 1 dB/m for a bending radius of 10 mm.

11. The optical fiber according to claim 1 having, at a wavelength of 1550 nm, microbending losses that are 80 percent less than the microbending losses for a SSMF under identical constraints.

12. The optical fiber according to claim 1 having, for the fundamental mode at a wavelength of 1550 nm, an effective area ($A_{eff}$) greater than or equal to 80 μm².

13. The optical fiber according to claim 1 having an effective cut-off wavelength ($\lambda_{ceff}$) less than or equal to 1600 nm.

14. The optical fiber according to claim 1 having, at a wavelength of 1550 nm, less than 1.3 percent of the transmitted signal energy within said depressed inner cladding.

15. A dispersion compensating optical module comprising at least a portion of the optical fiber of claim 1.

16. The module according to claim 15 having, at a wavelength of 1550 nm, insertion losses less than or equal to 12.5 dB for a cumulated chromatic dispersion of 1338 ps/nm.

17. The module according to claim 15 having, at a wavelength between 1530 nm and 1570 nm, insertion losses less than or equal to 13 dB for a cumulated chromatic dispersion of 1338 ps/nm.

18. The module according to claim 15 having, at a wavelength of 1550 nm, a polarization mode dispersion less than or equal to 0.50 ps.

19. The module according to claim 15, further comprising a housing into which said portion of fiber is rolled up, said housing having a thickness that is at least 25 percent smaller than the thickness of a housing receiving a SSMF for an identical cumulated chromatic dispersion value.

20. A dispersion compensating optical fiber comprising:
a central core surrounded by an external optical cladding, said central core having a radius $r_1$ and a refractive index difference $Dn_1$ with said external optical cladding;
an intermediate cladding positioned between said central core and said external optical cladding, said intermediate cladding having a radius $r_2$, a width $(r_2-r_1)$ greater than or equal to about 2.0 microns, and a refractive index difference $Dn_2$ with said external optical cladding;
a depressed inner cladding positioned between said intermediate cladding and said external optical cladding, said inner cladding having a radius $r_3$ and a refractive index difference $Dn_3$ with said external optical cladding, the refractive index difference $Dn_3$ being less than or equal to about $-3.0 \cdot 10^{-3}$, wherein at a wavelength of 1550 nm, the optical fiber has a positive chromatic dispersion greater than or equal to about 21 ps/(nm·km), a ratio of the mode radius of the fundamental mode LP01 propagating in the optical fiber ($W_{02}$) over the radius of the intermediate cladding ($W_{02}/r_2$) less than or equal to about 0.7, and a Figure of Merit (FOM) greater than or equal to 105 ps/nm/dB.

21. A dispersion compensating optical fiber comprising:
a central core surrounded by an external optical cladding, said central core having a radius $r_1$ and a refractive index difference $Dn_1$ with said external optical cladding;
an intermediate cladding positioned between said central core and said external optical cladding, said intermediate cladding having a radius $r_2$, a width $(r_2-r_1)$ greater than or equal to about 2.0 microns, and a refractive index difference $Dn_2$ with said external optical cladding; and
a depressed inner cladding positioned between said intermediate cladding and said external optical cladding, said inner cladding having a radius $r_3$ and a refractive index difference $Dn_3$ with said external optical cladding, the refractive index difference $Dn_3$ being less than or equal to about wherein at a wavelength of 1550 nm, the optical fiber has a positive chromatic dispersion greater than or equal to about 21 ps/(nm·km) and a ratio of the mode radius of the fundamental mode LP01 propagating in the optical fiber ($W_{02}$) over the radius of the intermediate cladding ($W_{02}/r_2$) less than or equal to about 0.7; and
wherein at a wavelength of 1625 nm, the optical fiber has bending losses less than or equal to about 1 dB/m for a bending radius of 10 mm.

* * * * *

UNITED STATES PATENT AND TRADEMARK OFFICE
CERTIFICATE OF CORRECTION

PATENT NO. : 7,356,234 B2 Page 1 of 1
APPLICATION NO. : 11/743365
DATED : April 8, 2008
INVENTOR(S) : Louis-Anne de Montmorillon et al.

It is certified that error appears in the above-identified patent and that said Letters Patent is hereby corrected as shown below:

On the Title Page

Item 74 reads "Summa, Allan & ~~Addition~~, P.A." and should read:
--Summa, Allan & Additon, P.A.--

Claim 21, at column 14, line 19 reads "or equal to about wherein at a wavelength of 1550 nm," and should read: --or equal to about -3.0 • $10^{-3}$, wherein at a wavelength of 1550 nm,--

Signed and Sealed this

Sixteenth Day of September, 2008

JON W. DUDAS
*Director of the United States Patent and Trademark Office*